April 25, 1967     F. N. WOODHOUSE     3,315,493
ADJUSTABLE TORQUE SPINDLE
Filed April 26, 1965
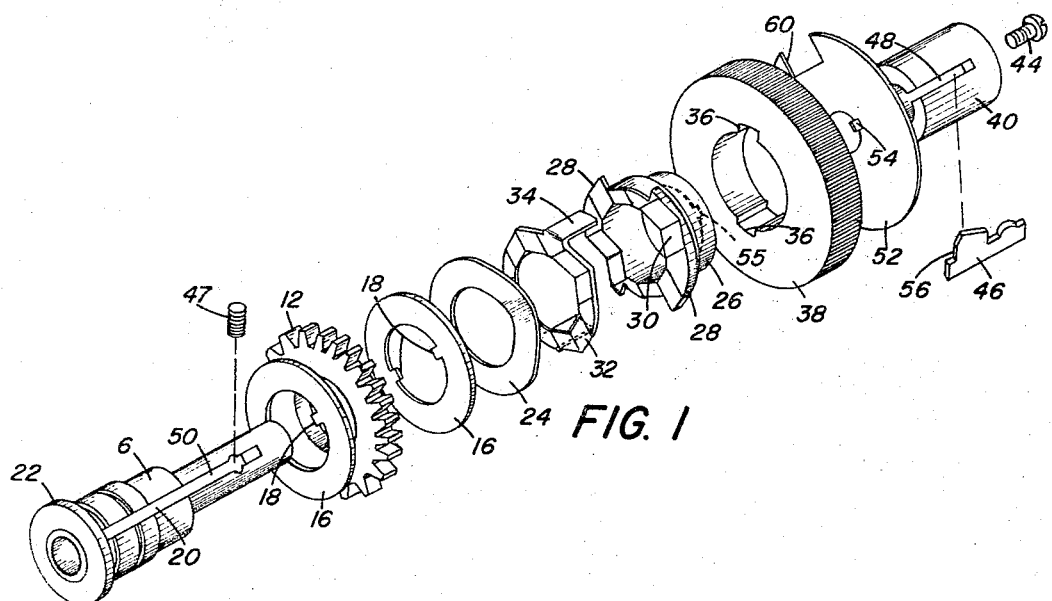
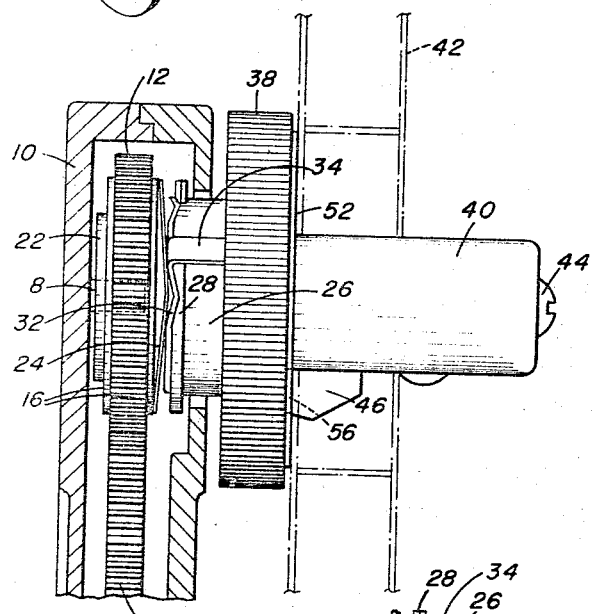
FIG. 2
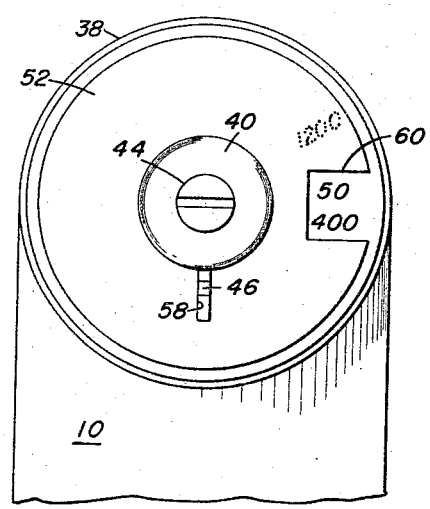
FIG. 3
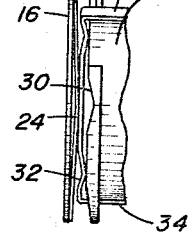
FIG. 4
FRED N. WOODHOUSE
INVENTOR.
BY R. Frank Smith
Steve W. Grembau
ATTORNEYS

United States Patent Office 3,315,493
Patented Apr. 25, 1967

3,315,493
ADJUSTABLE TORQUE SPINDLE
Fred N. Woodhouse, Rochester, N.Y., assignor to Eastman Kodak Company, Rochester, N.Y., a corporation of New Jersey
Filed Apr. 26, 1965, Ser. No. 450,881
7 Claims. (Cl. 64—30)

This invention relates generally to spindles, and more specifically to an improved spindle having accessible means incorporated therein for adjusting the torque output of the spindle.

It is well known in the art to provide spindles for supporting and rotatably driving a motion picture projector reel or the like. Normally, such spindles are driven by a drive mechanism through some suitable slip clutch to allow slippage to occur between the spindle and the drive mechanism when the torque applied to the spindle exceeds a safe value. This provides a safety device preventing the spindle from tearing a web being wound on the reel.

The torque requirements for winding a web on a reel vary depending upon the length of the web that is to be wound. Naturally, in order to wind up a 1200-foot web, the torque applied to the spindle and take-up reel would have to be greater than that required to wind up a 400-foot roll. This is, of course, due to the fact that the 1200-foot roll has a much greater diameter and weight than the 400-foot roll. One of the disadvantages of the prior known adjustable torque spindles is that the mechanism for adjusting the torque is normally of a complicated construction and not readily accessible to the operator for adjustment. Applicant's improved spindle is believed to obviate these and other disadvantages of prior known adjustable torque spindles.

This invention includes within its scope and adjustable torque spindle having an adjusting member mounted on the spindle to form a backstop for a reel, and movable between two positions for selectively adjusting the torque applied to the reel between two values.

One of the objects of the present invention is to provide an improved adjustable torque spindle that is of simple design and construction, thoroughly reliable and efficient in operation, and economical to manufacture.

Another object of the invention is to provide an improved adjustable torque spindle in which the mechanism for adjusting the torque output of the spindle is readily accessible to the operator for adjustment.

Another object of the invention is to provide an improved adjustable torque spindle in which a portion of the mechanism for adjusting the torque also serves as a backstop for a take-up reel mounted on the spindle.

Objects and advantages other than those set forth above will be apparent from the following description when read in connection with the accompanying drawings, in which:

FIG. 1 is an exploded view in perspective of an adjustable torque spindle constructed in accordance with one embodiment of this invention;

FIG. 2 is a side elevation view of the spindle of FIG. 1 shown in its assembled condition with the torque adjusting member in one position;

FIG. 3 is a front elevation view of the spindle of FIG. 2; and

FIG. 4 is a segmental view of the spindle of FIG. 2 showing the torque adjusting member in the other position.

Referring to the drawings, the adjustable torque spindle of this invention comprises a drive shaft 6 rotatably supported by a stub shaft 8 (see FIG. 2) mounted on a frame 10. A drive gear 12 is rotatably mounted at one end of drive shaft 6 and is driven by any suitable drive mechanism, not shown, through a gear train, only one gear 14 of which is shown.

The drive gear 12 is drivingly connected by a clutch to drive shaft 6 for driving same. The clutch comprises a pair of clutch plates or rings 16 keyed to drive shaft 6 by internal lugs 18 nesting in corresponding axially extending grooves 20 in shaft 6. One ring is interposed between drive gear 12 and a shoulder 22 on drive shaft 6, and the other ring is interposed between drive gear 12 and an annular, arcuately shaped spring 24. Naturally, when an axial force is applied by spring 24 to clutch ring 16 urging it into frictional engagement with drive gear 12, the drive gear will drive shaft 6 depending upon the friction developed between clutch rings 16 and drive gear 6 interposed therebetween. Obviously, the torque developed by drive gear 12 as a consequence of the frictional force between rings 16 and gear 12 will increase as the spring force urging rings 16 together increases. The spring force is varied simply by compressing spring 24 to a greater or lesser degree.

The mechanism for adjusting the amount of torque supplied to the spindle by axially compressing and releasing spring 24 between a first condition, in which a spindle torque of a predetermined value is developed, and a second condition, in which a different torque value is developed, will now be described. The mechanism comprises an annular cam element 26 (see FIG. 1) mounted on drive shaft 6 and fixed thereto by means to be described hereinafter. The cam element 26 has radially extending lips 28, each having an axially directed, V shaped outer cam surface 30. An annular cam follower 32 having a cam surface complementary to each cam surface 30 is interposed between cam element 26 and spring 24. The cam follower 32 further has a pair of axially extending lugs 34 passing between lips 28 on cam element 26 and into internal recesses 36 on a knob 38. The knob 38 is rotatable about cam element 26 between two positions defined by the interaction of lugs 34 and lips 28. In one position of knob 38, cam follower 32 nests into cam element 26 (see FIG. 2) with spring 24 in its first condition, compressed a sufficient amount to exert a predetermined axial force on drive gear 12, which in turn produces a predetermined torque. Movement of knob 38 clockwise as seen in FIG. 3 to its other position, causes cam element 26 to cam follower 32 axially in a direction compressing spring 24 to its second condition (see FIG. 4) thereby increasing the clutching action between drive gear 12 and clutch rings 16 so that a greater torque is applied to the spindle and any take-up reel 42 mounted thereon.

A hub member 40 for receiving take-up reel 42 encircles one end of drive shaft 6 and is secured thereto by screw 44. The hub member 40 is keyed to drive shaft 6 by a drive key passing through an axial slot 48 in hub member 40, and extending into an axially extending slot 50 in one end of drive shaft 6 against the bias of a spring 47. An indicator disk 52 is interposed between hub member 40 and cam element 26, and is keyed to cam element 26 by a lug 54 engaging a notch 55 therein, seen dotted in FIG. 1. The disk 52 and cam element 26 are further keyed to drive shaft 6 by key end 56 inserted in a slot 58 in disk 52 (see FIG. 3). The knob 38 and disk 52 provide a backstop for reel 42. The disk 52 further has a peripheral notch 60 (see FIG. 3) through which the operator can observe suitable indicia inscribed on knob 38 as it is turned between its two positions. In one position of knob 38, as seen in FIGS. 2 and 3, the operator may see an indicia such as 50–400 which would indicate to him that the torque supplied to the spindle and reel 42 is the required torque for winding up a roll of film or the like varying from 50 to 400 feet in length. When knob 38 is moved clockwise in FIG. 3 to its other position, the indicia 1200 becomes visible to the operator through notch 60 to indicate that the torque supplied to reel 42 has been increased for winding up a film 1200 feet long.

The invention has been described in detail with particular reference to one embodiment thereof, but it will be understood that variations and modifications can be effected within the spirit and scope of the invention as described hereinabove, and as defined in the appended claims.

I claim:
1. In an improved spindle mechanism for applying more than one predetermined value of torque to a reel, the combination comprising:
   a drive shaft for driving a reel;
   drive means;
   slip clutch means frictionally interconnecting said drive means to said drive shaft for driving same; and
   adjusting means for said slip clutch means rotatably mounted on said drive shaft to provide a backstop for said reel, said adjusting means further being rotatably movable around said shaft between a first position for adjusting said slip clutch means to achieve a predetermined torque of one value, and a second position for adjusting said slip clutch means to achieve a torque of a different value.

2. The invention according to claim 1 wherein said slip clutch means comprises an adjustable spring movable between a first condition for frictionally interconnecting said drive means and drive shaft with one force, and a second condition for frictionally interconnecting said drive means and drive shaft with a different force, and said adjusting means comprises a cam secured to said drive shaft, a cam follower for adjusting said spring and interposed between said cam and said spring, and a knob rotatable on said cam and connected to said cam follower for moving said cam follower to adjust said spring between its first and second conditions.

3. The invention according to claim 1 wherein said adjusting means comprises a cam follower movable between said first and second positions, and said slip clutch means comprises a spring responsive to said cam follower for varying the frictional interconnection between said drive means and said drive shaft to achieve two different values of torque.

4. The invention according to claim 3 wherein said adjusting means further comprises a cam secured to said drive shaft, and a knob rotatable on said cam and connected to said cam follower for moving same between its first and second positions.

5. The invention according to claim 4 wherein said cam follower has a lug, and said cam has a pair of spaced lips forming stops for said lug for limiting movement of said cam follower between its first and second positions.

6. The invention according to claim 4 and further including a reel supporting member mounted on said drive shaft, an indicator disk interposed between said reel supporting member and said cam and keyed to said cam, and a key for keying said indicator disk and said reel supporting member to said drive shaft with said knob and said disk in a position to form a backstop for a reel mounted on said reel supporting member.

7. The invention according to claim 6 wherein indicia are placed on one side of said knob, and said indicator disk has a peripheral notch therethrough through which the indicia on said knob may be viewed upon rotation of said knob relative to said disk for moving said adjusting means between its first and second positions.

References Cited by the Examiner
UNITED STATES PATENTS

| | | | |
|---|---|---|---|
| 875,800 | 1/1908 | Gilson | 64—30 |
| 1,377,112 | 5/1921 | Boyland. | |
| 2,599,292 | 6/1952 | Steinbach | 64—30 |
| 2,709,349 | 5/1955 | Kuehn | 64—30 |
| 2,928,265 | 3/1960 | Askren | 64—30 |

References Cited by the Applicant
UNITED STATES PATENTS 2,483,528    10/1949    Christoff.

FRED C. MATTERN, Jr., *Primary Examiner.*

HALL C. COE, *Examiner.*